United States Patent [19]
Peterson et al.

[11] Patent Number: 5,400,138
[45] Date of Patent: Mar. 21, 1995

[54] PROGRAMMABLE SPECTROPHOTOMETER USING A DATA MEMORY FOR STORING A SEQUENCE OF GENERALIZED COMMANDS

[75] Inventors: Steven H. Peterson, Wyoming; Ross Ouwinga, Grand Rapids; James L. Overbeck, East Grand Rapids, all of Mich.

[73] Assignee: X-Rite, Incorporated, Grandville, Mich.

[21] Appl. No.: 979,196

[22] Filed: Nov. 20, 1992

[51] Int. Cl.$^6$ ............................................. G01J 3/50
[52] U.S. Cl. ................... 356/319; 356/402; 364/526
[58] Field of Search ............... 356/319, 402; 364/526

[56] References Cited

U.S. PATENT DOCUMENTS

| | | | |
|---|---|---|---|
| 4,591,978 | 5/1986 | Peterson et al. | 364/200 |
| 4,935,875 | 6/1990 | Shah et al. | 364/497 |
| 4,961,646 | 10/1990 | Schrämmli et al. | 356/328 |
| 5,267,178 | 11/1993 | Berner | 364/498 |

OTHER PUBLICATIONS

"The GRETAG SPM 100 TM Spectrophotometer is the Optimum Complement for GRETAG's Spectrum of World-Renowned Densitometers", 20 Dec. 89.

*Primary Examiner*—F. L. Evans
*Assistant Examiner*—Peter J. Rashid
*Attorney, Agent, or Firm*—Varnum, Riddering, Schmidt & Howlett

[57] ABSTRACT

A color measuring system includes a portable spectrophotometer connectable to a general-purpose computer. The portable unit includes a microprocessor with a read-only program memory storing machine executable instructions to implement data processing for color measurement purposes and input/output functions including key reading and data transfer functions and display functions. A random-access data memory is used to temporarily store process data for later transfer to the general-purpose computer. An editor program and a compiler program in the general-purpose computer may be used to generate a program for the microprocessor using high-level, generalized commands. After such a program has been written and compiled in the general-purpose computer, it is transferred to a command buffer area in the random-access data memory of the microprocessor. The microprocessor, in its program memory, includes a command interpreter including a predefined sequence of machine executable instructions for each generalized command. When executed, the command interpreter reads a generalized command from the data memory and, if necessary, updates relevant data pointers and executes the predefined sequence of machine executable functions in the program memory corresponding to the generalized command being processed. A user, using the general-purpose computer, may specify any desired sequence of measurement operations by specifying functions to be performed by the microprocessor, including the display of prompts to the operator of the portable spectrophotometer to instruct the operator to perform various specified operations.

16 Claims, 6 Drawing Sheets

TEXT
DATA

WRITE TEST
WRITE NUMBER

BEEP
SCAN KEYS

LOAD REGISTER
INCREMENT REGISTER

GOTO
DO SUB
RETURN

COMPARE
IF EQUAL
MEASURE
COMPUTE AVERAGE

COLOR TEST
REFERENCE

Fig. 2

PROGRAMMABLE SPECTROPHOTOMETER USING A DATA MEMORY FOR STORING A SEQUENCE OF GENERALIZED COMMANDS

BACKGROUND OF THE INVENTION

1. Field of the Invention

The invention relates to spectrophotometers and, more particularly, to spectrophotometers operating under control of a programmable processor.

2. Prior Art

Spectrophotometers are commonly used in the measurement of color for compliance with a predetermined standard for quality-control purposes. Such measurements are commonly made on products such as fabrics, photographs, and the like, typically using permanently installed equipment. Color measurements must also be made on automobiles and other larger bodies or structures, and for such purposes, portable spectrophotometers may be used.

The measurement of color involves measuring light reflected from an object and determining the intensity of its color components. Photodetectors are used to convert optical signals to electrical signals which are indicative of the intensity of the optical signal. The generated electrical signals are used to compute spectral values which are compared against a standard to determine whether the color of an object meets the standard for that object.

Spectrophotometers typically include a source of light projected onto an object, photodetectors detecting light reflected from the object, and signal processing circuitry connected to the photodetectors to compute curves or numerical values indicative of color. The general principles of color measurement and the construction of use of color measuring instruments are well known and understood by those skilled in the art and are described in published texts such as the *Measurement of Appearance,* by Richard S. Hunter, John Wiley & Sons, 1975, and the *Measurement of Colour,* by William D. Wright, Van Nostrand, Reinhold Co., 1969.

Different types of spectrophotometers are known using angular or spherical optical measuring devices for the measurement of color in different circumstances. State-of-the-art spectrophotometers, whether using angular or spherical optical devices, include microprocessors which perform some signal processing on the electrical signals generated by the photodetectors in order to compute numerical values indicative of color. Such microprocessors may be programmed to execute a variety of algorithms, not only for the basic computation of data reflective of the measured color, but also for comparing the resultant data with data indicative of upper and lower limits of a color standard in order to provide a pass/fail test. State-of-the-art spectrophotometers may also provide an audible signal or an electronically displayed message to an operator indicating the results of a pass/fail test.

Known spectrophotometers may also display text in the form of specific instructions to an operator regarding the use or calibration of the device.

A problem with the prior art devices is that they are specifically designed for a particular job or operation and are not readily adaptable to accommodate changes in quality-control procedures which are required from time to time. Furthermore, each company or organization generally has its own requirements for quality control and consequently for color measurements. Even though portable spectrophotometers typically include a programmable microprocessor, its programs are not readily alterable since, for cost, space and reliability reasons, the programs are embedded in firmware, such as integrated circuit read-only memory devices. In the prior art, the introduction of a change in the program sequences which define color computations to be performed by the microprocessor requires the generation of a new, firmware imbedded program by the manufacturer and replacement or modification of the read-only memory. Furthermore, each company, or in larger companies, each operational department, has different specific requirements which are desirable to be programmed into the spectrophotometer. Accordingly, there tends to be a proliferation of spectrophotometers, all of which must be separately produced or modified by the manufacturer.

A significant concern by companies using spectrophotometers is the delay which is necessarily introduced between the time that the need for a new spectrophotometer is recognized and the time that such a device is shipped and ready for use. A further shortcoming of known spectrophotometers is that the operator has to be provided with separate instructions as to what measurements are to be taken, the order in which they are to be taken, etc. Such instructions are usually in the form of a paper document with specific steps to be followed and requiring the operator to make written notations identifying the measurements recorded in the instrument.

SUMMARY OF THE INVENTION

These and other problems of the prior art are solved in accordance with the principles of this invention by providing method and apparatus for executing functions to be performed by a spectrophotometer using predefined generalized commands arranged by the instrument's user to specify functions to be performed by the instrument. In accordance with this invention, a sequence of generalized commands defined by the user is stored in a command buffer in the random-access memory of the spectrophotometer. The generalized commands of the sequence are executed under control of a command interpreter in the read-only memory of the spectrophotometer. The internal processor reads the command buffer and executes a sequence of machine executable instructions defined in the read-only program memory for each of the specified generalized commands.

Functions to be performed by a spectrophotometer, in accordance with this invention, may be defined by the user of the instrument by defining a sequence of the generalized commands in a general-purpose host computer. The sequence of generalized commands is compiled within the host computer in accordance with predefined codes and is transferred to the spectrophotometer via an input/output port and a standard data interface. The encoded sequence of generalized commands and any associated data specified from the host computer is stored in the command buffer in the random-access data memory. Thereafter, the spectrophotometer may be disconnected and used in areas remote from the host computer. In operation, the command interpreter in the read-only program memory of the spectrophotometer includes the identity of the predefined generalized commands and a corresponding predefined sequence of machine executable instructions for each generalized command.

Advantageously, in a system in accordance with this invention, a quality-control specialist may use the generalized commands to create a color measuring procedure, including instructions or prompts to an operator and download the sequence of generalized commands defining the procedure directly from the general-purpose host computer to the spectrophotometer. The microprocessor within the spectrophotometer, by performing standard data memory and program memory operations defined in its read only program memory is able to execute the sequence of functions without the need for any modification of any hardware or firmware in the spectrophotometer, as is necessary in prior art arrangements.

In accordance with a specific embodiment of the invention, the machine executable instructions in the program memory include data memory reading instructions, each including identification of a pointer location in data memory which stores the identity of data to be obtained from memory. When the interpreter program is executed, it obtains pointer data from the command buffer storing the generalized commands and updates the relevant pointers for the machine executable instructions defined in the interpreter program for each generalized command.

Furthermore, in accordance with this invention, the generalized commands include commands to display text on a display screen and a quality-control procedure including instructions to a spectrophotometer operator may be generated on the host computer and transferred to the spectrophotometer to cause the necessary prompts to be displayed from time to time to direct the operator to implement a step-by-step color measuring procedure. Advantageously, the instructions are contained within the instrument rather than in a separate document and are readily displayed to the operator at appropriate times in the color measuring process. Additionally, the instructions may be readily changed by a quality-control specialist from a general-purpose computer without the need to involve the manufacturer of the instrument and without the expense or delays necessarily involved with any change in procedure in prior art devices.

In accordance with one aspect of the invention, a bar code reader is connected to the spectrophotometer during the measuring process, and an operator directing the bar code reader to predefined bar codes identifying, for example, the name of the operator, a customer name, batch identification, etc., may cause the bar code data to be received by the spectrophotometer. The bar code information will be stored in the spectrophotometer in association with color measurement data obtained in a color measuring operation. Advantageously, the recordation of such non-color information with color measuring data greatly facilitates analysis of the stored data after it has been transferred from the spectrophotometer to a general-purpose computer.

BRIEF DESCRIPTION OF THE DRAWING

An illustrative embodiment of the invention is described below with reference to the drawing in which:

FIG. 2 is a listing of exemplary generalized commands used in the system of FIG. 1;

DETAILED DESCRIPTION

Figure 1:
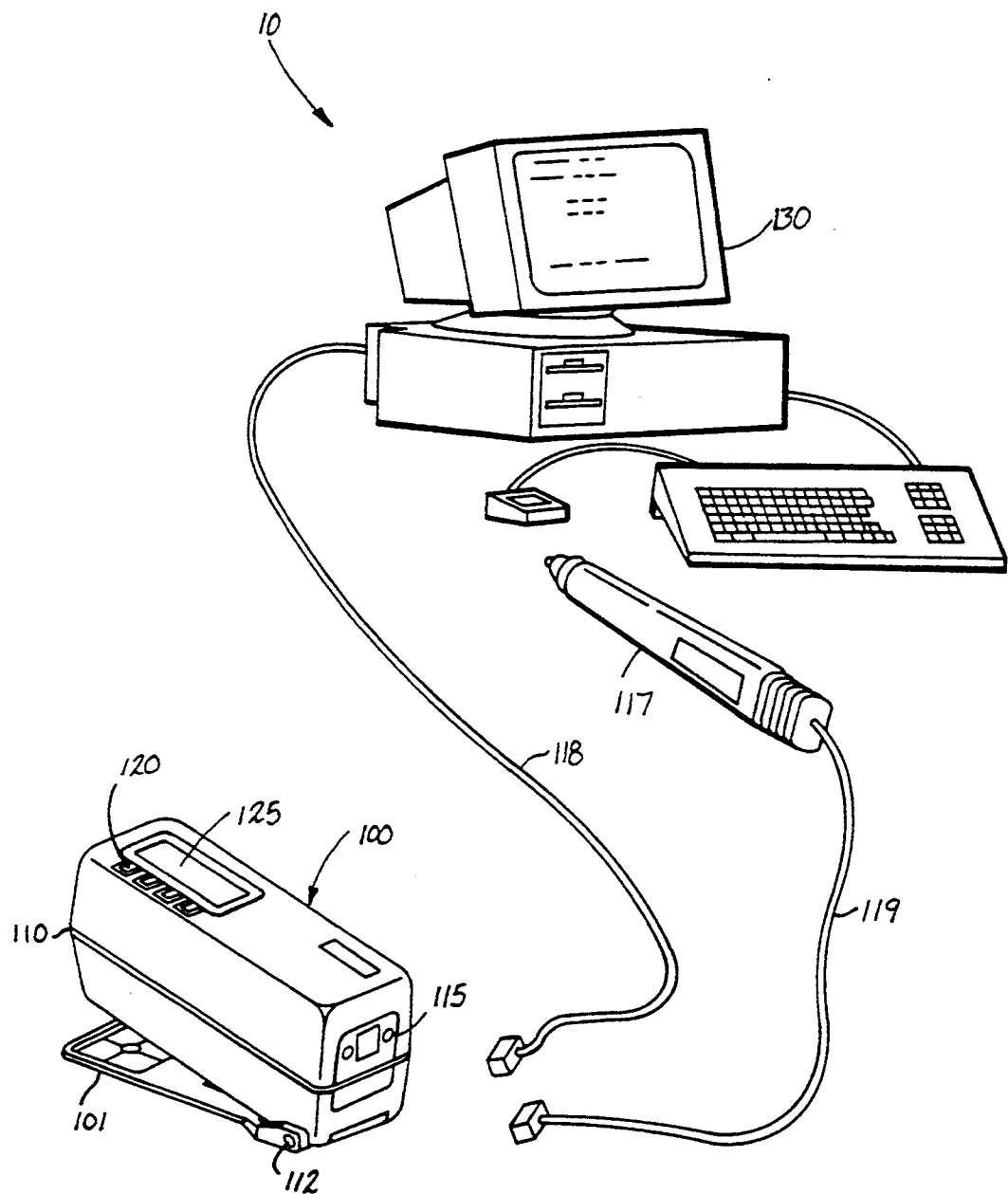
FIG. 1 is a perspective view of a color measuring system, including a portable spectrophotometer and a host computer.

FIG. 1 is a perspective schematic view of a color measuring system 10 including a portable spectrophotometer 100. The unit 100 incorporates an optical measuring device such as a well-known spherical measuring device or a well-known angular measuring device together with a light source and one or more photodetectors which detect the light reflected from an object to be measured. Additionally, the unit 100 incorporates signal processing circuitry which processes electrical signals from the photodetectors and generates and stores data representative of color measurements, in a well-known fashion. A host computer 130 is connectable to spectrophotometer 100 and transfers data to and receives data from it. A bar code reader wand 117 is connectable to spectrophotometer 100 to transmit bar code data to it.

The portable spectrophotometer 100 includes a bottom plate 101 and a housing 110 which is hingedly attached to bottom plate 101 at the hinge connection 112. In a typical configuration, the housing 110 is biased in a direction away from the bottom plate. When an object is to be measured, the bottom plate is positioned against the object and a slight pressure against the housing 110 in the direction of the bottom plate 101 activates the light source and color measuring circuitry by means of a standard switch (not shown in the drawing).

The operation of the spectrophotometer 100 is controlled to some extent by means of a plurality of keys 120. They may be used to initiate certain action or to provide input information relating to the object measured such as identification or temperature/humidity information which can be stored with the measurement data for later use. A display 125, which may be a well-known liquid crystal display, is incorporated in the housing 110 to display a text to the operator. Such text, when displayed, may form an instruction to an operator to prompt the operator to follow certain procedures in the measuring of an object.

The housing 110 comprises a pluggable electrical connector 115 which is connectable to cable 118 and computer 130 and is connectable to cable 119 and bar code reader 117. The computer 130 may be any of a number of commercially available personal computers or the like which is capable of interfacing with the portable spectrophotometer. A known data interface such as described in U.S. Pat. No. 4,591,978, issued May 27, 1986, and entitled "Method of Interrelating a Master Computer with a Peripheral Device" may be used to transfer data between the portable unit 100 and the computer 130. When the unit 100 is connected to computer 130 via cable 118, the portable device 100, under control of the computer 130, transmits data obtained from a number of color measurements to the computer 130 for analysis.

The bar code reader wand 117 may be a commercially available device such as, for example, the HBCR 8200 sold by Hewlett Packard Corporation. The wand is adapted to read bar codes and to transmit decoded bar code data in a serial ASCII format. The cable 119 is adapted to be connected to connector 115 of the unit 100. The wand is preferably used by an operator to enter data, e.g., operator identification, customer identification, batch number, etc., in the unit 100 prior to taking a color measurement. The entered data is stored in the unit 100 in association with color measurement data and is transmitted together with the associated color data when the unit 100 is connected to computer 130 via cable 118.

As will be described further in subsequent paragraphs herein, the computer 130 may also be utilized to transmit data to the portable device 100 to define specific tasks to be performed by portable unit 100. The measurement of color is primarily for purposes of quality control and a number of different procedures may be used to gather such information from various units under a number of different conditions. The display 125 is capable of displaying a certain amount of text which outlines the procedure to be followed by the operator of the unit. Typically, a quality-control specialist will define the procedures to be followed and interpret the data gathered in each step of the procedure. Furthermore, the signal processing circuitry in unit 100 is able to compare color readings against predefined values and to provide pass/fail indications to the operator.

The quality-control specialist, in a system in accordance with this invention, has available a list of predefined higher-level, generalized commands which may be used to define a sequence of functions to be performed by the portable unit 100. Specifically, the generalized commands, when loaded into the portable unit 100 from computer 130, may cause unit 100 to display selected prompts to the operator and to perform selected signal processing functions on the data obtained from color measurements. FIG. 2 is a partial listing of exemplary generalized commands available to the quality-control specialist to construct program sequences for causing the central processor to perform desired functions. The generalized commands include TEXT commands and DATA commands which store text or data at positions identified by the user for later retrieval. WRITE TEXT and WRITE NUMBER cause the unit 100 to display previously stored text or data on the display 125. The BEEP command causes the portable unit to produce an audible beep for the operator. A number of different beep lengths may be specified to communicate different signals to the operator. The SCAN KEYS command reads the state of the keys 120 as depressed by the operator. The user may specify a number of registers to be used in the program, and the instruction set includes instructions such as LOAD REGISTER and INCREMENT REGISTER and a number of other similar commands for decrementing and adding to or subtracting from a specified register are included. Furthermore, a number of program flow commands, such as the GO TO and DO SUB and RETURN commands, allow the user to construct a complete program to be implemented within the portable unit 100. Furthermore, COMPARE and IF commands give the system the capability to compare color readings and the like against defined values and allow the program to branch as a function of the results of a comparison. Commands such as MEASURE and COMPUTE AVERAGE allow the user to specify what is to be measured and when values are to be computed. The MEASURE command includes the capability to measure against a reference or to measure and store the data. COLOR TEST and REFERENCE commands allow the user to instruct when color tests are to be taken and to specify the references to be used. FIG. 2 is only an illustrative sample of the types of commands that may be used in specifying to the portable unit 100 the specific functions to be performed, and various other commands to perform relevant functions may be devised by those skilled in the art.

Figure 3:
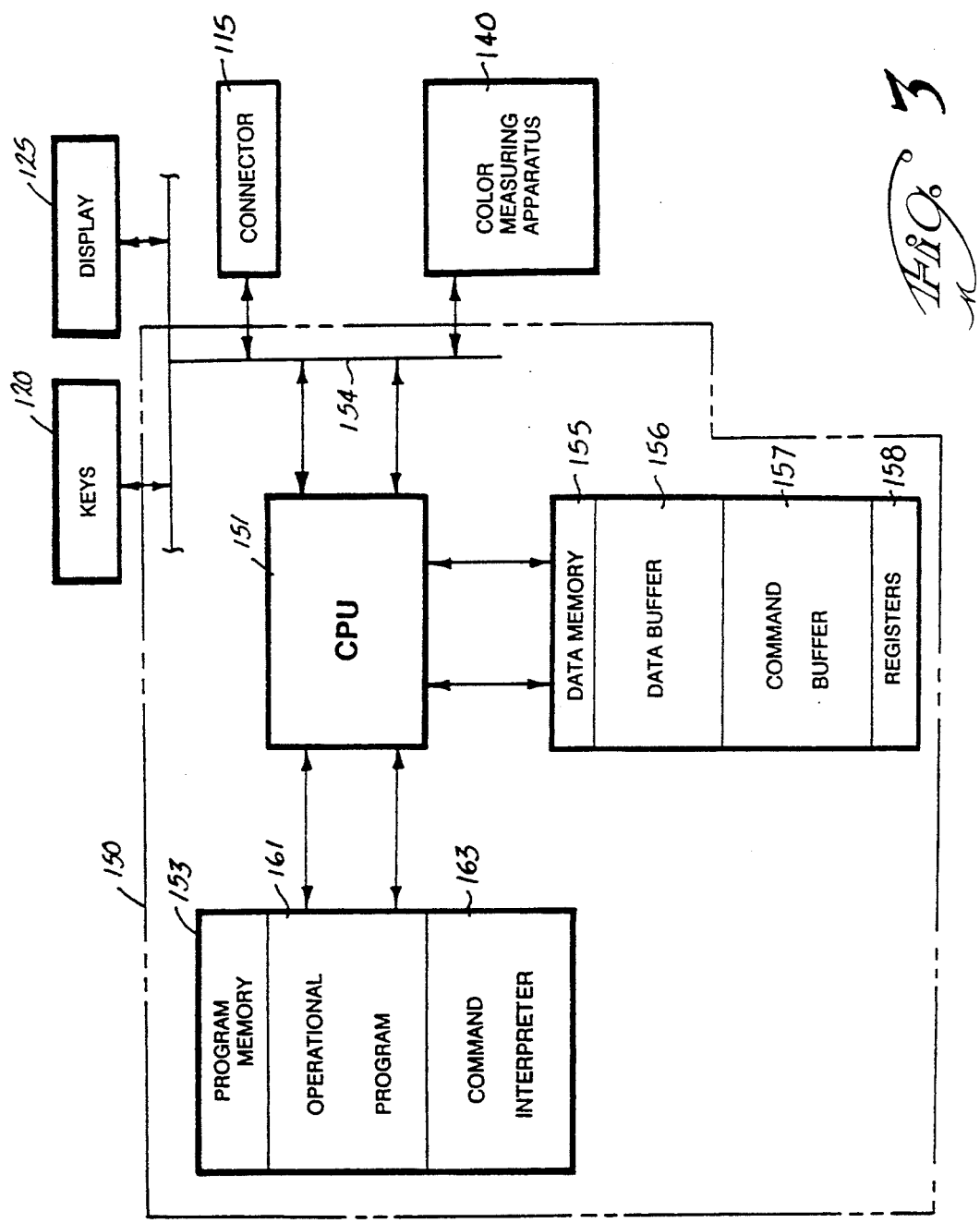
FIG. 3 is a diagrammatic representation of the control arrangement of the spectrophotometer of FIG. 1.
Figure 4:
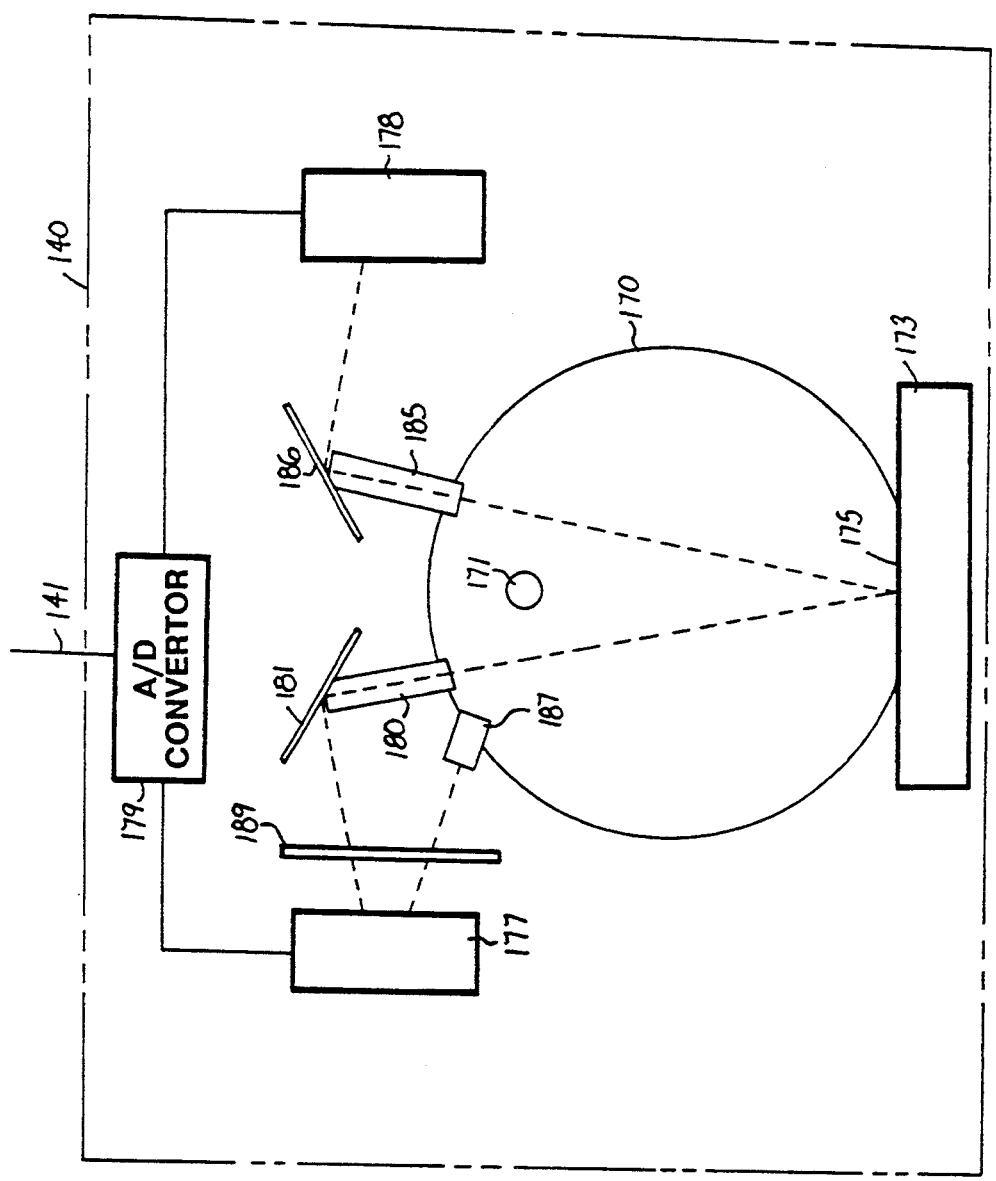
FIG. 4 is a diagrammatic representation of color measuring apparatus of FIG. 3.

FIG. 3 is a block diagram representation of electrical circuitry and apparatus internal to the spectrophotometer 100. Shown in FIG. 3 are the keys 120, the display 125, and the connector 115 depicted in FIG. 1, as well as color measuring apparatus 140 and a microprocessor 150. FIG. 4 is a diagrammatic representation of known color measuring apparatus, which is described in greater detail in copending U.S. application Ser. No. 07/880,807, filed May 7, 1992, entitled "Portable Spectrophotometer", assigned to the assignee of this invention. The color measuring apparatus 140 includes a measuring sphere 170, the inner surface of which is coated with a reflective coating. Light from a lamp 171 is diffused by the inner surface of the sphere, and components of the diffused light are projected onto an object sample 173 which is to be tested. Aperture 175 is directed to the object sample 173 and receives light reflected from the object sample. A portion of the light incident on the sample is reflected at an angle in alignment with apertures 180 and 185 and directed by means of mirrors 181 and 186 to photodetectors 177 and 178, respectively. A further aperture 187 is directed to an area of the inner wall of the sphere and provides a reading of the source light which is equivalent to the source light incident on the object sample 173 and may serve as a reference. The aperture 180 receives a particular component of the reflected light, namely, the specular component thereof, and the aperture 185 receives only diffused light from the object sample with respect to one particular component of source light. A shutter apparatus 189 alternately conducts light from apertures 180 and 187 at a periodic rate to the detector 177. The detectors 177 and 178 generate electrical analog output signals representative of the intensity of the received light. By means of the analog-to-digital convertor 179, the analog signals are converted to digital signals and transmitted to the microprocessor 150 via conductor 141.

Referring again to FIG. 3, the microprocessor 150 comprises a central processing unit (CPU) 151 which is connected to the connector 115, the keys 120, the display 125 and the color measuring apparatus 140 via an input/output bus 154. The microprocessor 150, which may be a well-known, commercially available microprocessor such as the INTEL 80C196 family of processors, includes a well-known, random-access data memory 155, a program memory 153, which may be any of a number of commercially available programmable, read-only (PROM) memory devices such as the well-known electrically erasable or flash memory devices. In typical operation, the CPU 151 monitors the various input devices and executes machine executable instructions from the program memory 153 to process data from the color measuring apparatus 140 and to store the same in the data memory 155. The CPU 151 is responsive to input signals from the keys 120 and connector 115 and is capable of displaying text or data on the display device 125. All data processing and input/output functions are performed by executing machine executable instructions from the read-only program memory 153.

The portable unit 100 is typically used by an operator to take color measurements in areas away from the computer 130. The operator may be prompted by text displayed on display device 125 to advance through a step-by-step measuring procedure and may, from time to time, input data associated with the measurements by means of the keys 120 or the bar code reader wand 117 and connector 115. The details of color measurement processing are well known and need not be described herein. The CPU 151 performs the desired color measurement data processing by execution of machine executable instructions from program memory 153 and stores the resultant data, together with associated data provided by the operator, in data buffer area 156 of data memory 155. The unit 100 is connected to computer 130 from time to time via cable 118 and connector 115. Upon receipt of a request from computer 130, the CPU 151 transfers previously stored data from the data memory 155 to computer 130.

As mentioned earlier herein, a person such as a quality-control specialist may define a sequence of functions to be performed by the microprocessor 150 by creating a program from high-level, generalized commands such as depicted, by way of example, in FIG. 2. The commands are compiled in the computer 130 and data defining the commands are transmitted via connector 115 to the CPU 151 and are stored as data in a part of the data memory 155 referred to as the command buffer 157. As stated with reference to FIG. 2, the generalized commands may include data to be stored in a set of identifiable registers for use in the execution of the functions specified in the command buffer 157. Registers 158 in data memory 155 are provided for that purpose.

The CPU 151 can execute only machine executable instructions stored in the read-only program memory 153 and hence cannot execute the generalized commands from the command buffer. Corresponding to each of the generalized commands, there exists a sequence of machine executable instructions which, when executed, implement the corresponding generalized command. An area of program memory 153 is designated as the command interpreter 163 and includes the sequences of machine executable instructions corresponding to the generalized commands. The remaining area of program memory 153 storing other CPU instructions is designated, for purposes of this description, as the operational program field 161.

Figure 5:
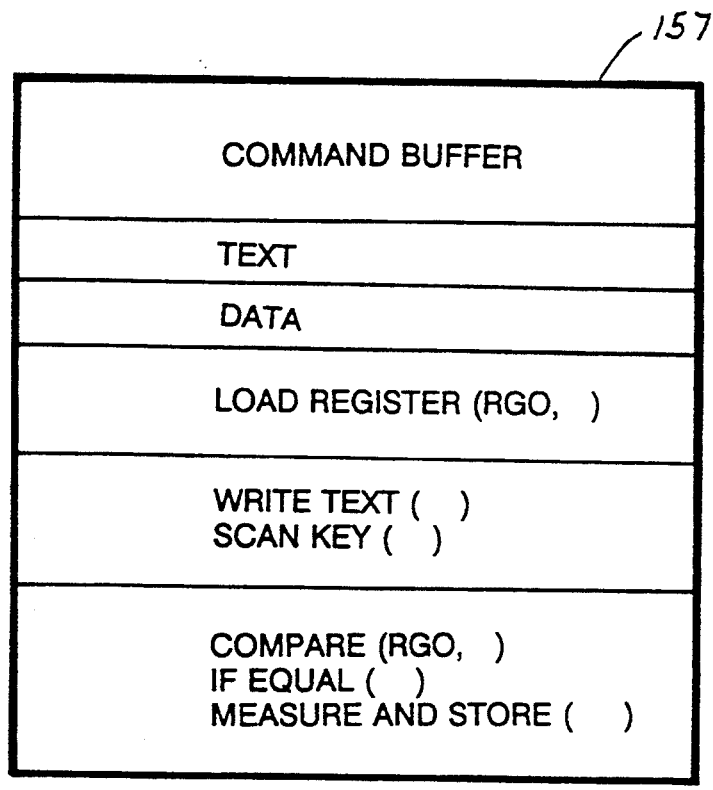
FIG. 5 is a diagrammatic representation of the command buffer of FIG. 3.

The quality-control specialist or the like uses the predefined generalized commands, such as those shown in FIG. 2, and creates a sequence of the generalized commands to cause the microprocessor 150 to perform certain functions which may relate to data processing or to interaction with an operator through the keys 120 and the text display 125. FIG. 5 is a diagrammatic representation of the command buffer 157 including an exemplary portion of a program created from a sequence of the generalized commands of FIG. 2. The command buffer 157 includes a predefined area, labeled TEXT, in which several strings of text may be stored in individual locations. A similar area labeled "DATA" is reserved for data. A LOAD REGISTER command loads identified data in one of the registers in the registers area 158 of the data memory 155. The contents of the register may be used in a subsequent program. The exemplary program portion shown in FIG. 5 includes WRITE TEXT and SCAN KEY commands which cause text to be written to the display 125 and subsequently cause the keys 120 to be scanned. The result of the key scanning operation will be stored in a location in memory which may then be compared with the contents of one of the registers 158, e.g., RGO by COMPARE (RGO, nnn). If the comparison result shows that the compared values are equal, a transfer may be made to another address within this program sequence by means of the IF EQUAL command. If they are not equal, the program will continue with the next instruction, which is MEASURE AND STORE, to measure and to store the resultant data. It will be apparent to those skilled in the art that using a set of generalized commands, such as shown by way of example in FIG. 2, any number of program sequences using the high-level generalized commands can be created.

Such a program of generalized commands may be created on the general-purpose computer 130 by means of any one of a number of commercially available editor programs in a known fashion. A standard compiler in the general-purpose computer 130 codes the instructions in accordance with predefined binary codes. The program sequence, in the form of binary coded data, is transmitted to the processor 150 via the aforementioned interface and stored in the command buffer area 157 of the data memory 155.

Figure 6:
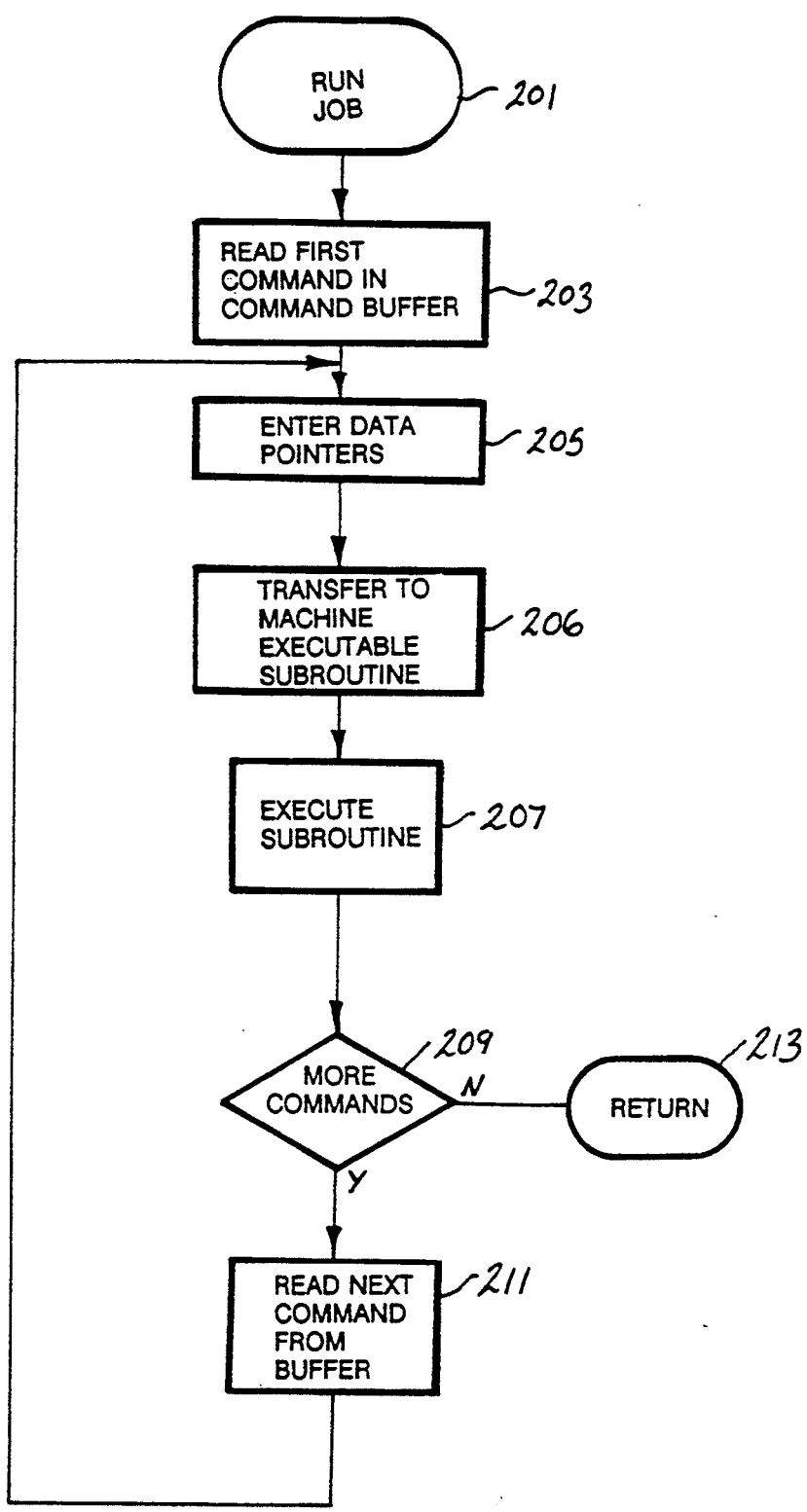
FIG. 6 is a flow diagram representation of the command interpreter of FIG. 3.

FIG. 6 is a flow diagram of the command interpreter program 163. In operation, the CPU 151 addresses the operational program area 161 of the program memory 153 to obtain machine executable instructions for the execution of the various functions such as color measurement, information processing, and input/output handling. Included in the operational program is a special instruction called "RUN JOB", which causes the CPU to transfer to the command interpreter program 163. The RUN JOB instruction may be executed in response to operation of one of the keys 125 or as part of a sequentially executed sequence. As shown in FIG. 6, the command interpreter program is entered from the RUN JOB instruction at block 201. As indicated in block 203 of FIG. 6, a first step is to read a first one of the generalized commands in the command buffer 157 at a specified address in the data memory 155. As mentioned earlier, execution of a single generalized command usually requires execution of a sequence of machine instructions. Certain of the machine instructions may involve memory reading or writing operations. Typically, such memory instructions include fixed data store address locations in which pointer addresses are stored identifying the memory location to be used in the execution of the machine instruction. A step in the command interpreter program is to obtain memory addresses defined with the generalized command and enter corresponding designations in the address pointer areas for use by the machine executable instructions. That function is represented by block 205 of FIG. 6. Thereafter, a transfer is made to the sequence of machine executable instructions, referred to as the machine executable subroutine, as shown in block 206. Thereafter, as indicated in block 207, the subroutine is executed to thereby complete execution of one of the generalized commands. A test is made, as indicated in block 209, whether there exist more generalized commands which have to be executed. If not, a return is made to the general operating program of CPU 151. If additional commands do exist, a next command is read as indicated in block 211 and a return is made to block 205 to again enter appropriate data pointers and to execute the corresponding machine executable subroutine. Thus, a complete program created on the general-purpose computer 130 and stored in the data memory 155 can be executed while the portable spectrophotometer 100 is disconnected from the computer 130. In this manner, a quality-control specialist may define a complete color measurement procedure for quality-control purposes on a generalized computer, and the procedure may be executed in a spectrophotometer by an unskilled operator in areas away from the computer by means of appropriate prompts to the operator and selected key entries by the operator.

It will be appreciated that the embodiment disclosed herein is only exemplary of the principles of the invention and that numerous variations thereof can be devised by those skilled in the art without departing from the spirit and scope of the invention.

What we claim is:

1. A color measuring system including a portable spectrophotometer comprising:
   a light source for illuminating an object to be measured;
   color measuring apparatus including photodetectors generating electrical output signals representative of light reflected from an object to be measured;
   a programmable processor connected to the color measuring apparatus and including a read-only program memory and a random-access data memory for executing machine executable instructions permanently stored in the program memory and selectively reading data from and writing data into the data memory;
   the program memory including a command interpreter program identifying a plurality of predefined generalized commands and a predefined sequence of machine executable instructions for each of the plurality of predefined generalized commands identified in the command interpreter program;
   the data memory comprising a command buffer storing data defining a sequence of selected ones of the generalized commands;
   the processor executing the command interpreter program by reading each of the generalized commands of the sequence of generalized commands in the command buffer and by executing for each generalized command read from the command buffer a corresponding one of the predefined sequences of machine executable instructions.

2. The color measuring system in accordance with claim 1 wherein the spectrophotometer comprises an input/output terminal connected to the programmable processor and further comprising a host data processing computer connected to the input/output terminal, the computer comprising an editor program allowing an operator to enter a sequence of the generalized commands in the computer and wherein the computer and the signal processor communicate via the input/output terminal to transfer the entered sequence of generalized commands from the computer to the command buffer in the data memory, whereby the processor under control of the command interpreter program, executes sequences of machine instructions in the program memory corresponding to the generalized commands defined by an operator at the computer and transferred to the data memory.

3. The color measuring system in accordance with claim 2 wherein the machine executable instructions in the program memory include data memory reading and data memory writing instructions and each of the data memory reading and writing instructions includes identification of a pointer location in the data memory defining a pointer to another memory location in the data memory, and wherein the pointer location for each of the memory reading and memory writing instructions in the command interpreter program contains a pointer to a memory location in the command buffer.

4. The color measuring system in accordance with claim 2 wherein the spectrophotometer comprises a portable device for use by an unskilled operator away and disconnected from the computer, whereby a skilled operator may specify a variety of functions for the portable device in the computer and execute the specified functions in the portable device while disconnected from the computer without modification of any hardware or firmware in the portable device.

5. The color measuring system in accordance with claim 2 wherein the spectrophotometer comprises a display screen connected to the processor and wherein the generalized commands include an instruction to display text on the display screen and wherein execution of a specified sequence of the generalized commands sequentially displays prompts on the display screen instructing an operator to perform a prescribed sequence of color measuring functions with the spectrophotometer.

6. The color measuring system in accordance with claim 1 and further comprising a bar code reader wand electrically connected to the spectrophotometer for selectively transmitting data representative of bar code readings to the spectrophotometer and wherein the processor is responsive to the electrical output signals form the color measuring apparatus to store color measurement data and is responsive to data transmitted by the wand to store the transmitted data in the data memory in association with the color measurement data.

7. The color measuring apparatus in accordance with claim 1 wherein the spectrophotometer comprises at least one input key operable by an operator of the spectrophotometer and wherein the processor is responsive to operation of the input key to perform functions defined by the key.

8. The color measuring apparatus in accordance with claim 1 wherein the spectrophotometer comprises at least one input key operable by an operator of the spectrophotometer and wherein the data processor is responsive to the input key and to the electrical output signals of the color measuring apparatus to store color measurement data and data representative of operation of the input key.

9. In a color measuring system including a spectrophotometer comprising color measuring apparatus generating electrical output signals representative of color measurements and a signal processor including a read-only program memory and a random-access data memory for executing sequences of machine language instructions from the program memory to perform signal processing functions on electrical signals generated by the color measuring apparatus, a method of executing functions to be performed by the spectrophotometer comprising the steps of:
   fixing in the program memory indices identifying a plurality of predefined generalized commands and defining a sequence of machine executable instructions for each identified generalized command;

storing in the data memory a sequence of selected ones of the generalized commands;

reading a first generalized command from the data memory;

executing the sequence of machine executable instructions defined in the program memory for the first generalized command;

reading a next generalized command from the data memory and executing the sequence of machine executable instructions defined in the program memory for the next generalized command; and repeating the step of reading a next generalized command and executing the corresponding machine executable instructions until all generalized commands of the sequence of generalized commands has been executed.

10. The method in accordance with claim 9 in a color measuring system further comprising a computer and wherein the spectrophotometer is a portable device connectable to the computer and wherein the method further comprises the steps of creating the sequence of selected ones of the generalized commands in the computer and transferring the sequence of generalized commands from the computer to the spectrophotometer prior to the step of storing the sequence of generalized commands in the data memory, whereby functions to be performed by a color measuring system may be specified and changed from a general-purpose computer and executed in a portable spectrophotometer without modification to the processor or read-only memory of the spectrophotometer.

11. The method in accordance with claim 10 wherein the sequence of generalized commands includes data to be used in conjunction with the generalized commands, the method further including the step of compiling the generalized commands and assigning address codes to the commands and the data prior to the step of transferring.

12. The method in accordance with claim 9 in a system wherein the machine executable instructions include data memory reading instructions each including identification of an address pointer location in data memory storing an address pointer of another location in data memory and wherein the sequence of generalized commands includes data defining memory locations, the method further comprising the step of reading data defining memory locations from the sequence of generalized instructions stored in the data memory and selectively entering the data defining memory locations in the address pointer locations in data memory prior to the step of executing the sequence of machine executable instructions.

13. The method in accordance with claim 10 in a system wherein the spectrophotometer comprises a display screen and the generalized commands include a command to display text on the display screen, the method further comprising the steps creating on the computer a sequence of text displaying generalized commands defining a step-by-step color measuring procedure and the step of executing machine executable instructions to selectively display text on the display screen to prompt a spectrophotometer operator to perform the step-by-step color measuring procedure defined by the sequence of text displaying generalized commands, whereby step-by-step procedures to be performed by the operator of the portable spectrophotometer may be changed from the computer connectable thereto without modification of the signal processor or read-only memory of the spectrophotometer.

14. The method in accordance with claim 9 in a system wherein the spectrophotometer comprises at least one control key and wherein the generalized commands include commands to scan the at least one key and to perform functions depending on the state of the at least one key, the method further comprising the step of creating on the computer a sequence of generalized commands defining performance of different functions by the spectrophotometer as a function of the state of the at least one key at different times.

15. The method in accordance with claim 9 in a system wherein the spectrophotometer comprises at least one input key and further comprising the step of generating and storing data representative of color measurements and the step of storing data representative of operation of the key in association with the data representative of color measurements.

16. The method in accordance with claim 9 in a system wherein the system further comprises a bar code reader wand electrically connected to the spectrophotometer and further comprising the step of transmitting to the spectrophotometer data representative of bar code readings and the step of storing the data representative of bar code readings in the spectrophotometer in association with data representative of color measurements.

* * * * *